US012657973B2

(12) United States Patent
Rojas

(10) Patent No.: US 12,657,973 B2
(45) Date of Patent: *Jun. 16, 2026

(54) SYSTEMS AND METHODS FOR PROVIDING TEMPORARY ACCESS CREDENTIALS TO ACCESS PHYSICAL LOCATIONS

(71) Applicant: AXS Group LLC, Los Angeles, CA (US)

(72) Inventor: Michael J. Rojas, North Canton, OH (US)

(73) Assignee: AXS Group LLC, Los Angeles, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/800,372

(22) Filed: Aug. 12, 2024

(65) Prior Publication Data

US 2024/0404338 A1 Dec. 5, 2024

Related U.S. Application Data

(63) Continuation of application No. 18/450,645, filed on Aug. 16, 2023, now Pat. No. 12,087,113, which is a (Continued)

(51) Int. Cl.

| | |
|---|---|
| ***G07C 9/00*** | (2020.01) |
| ***G07C 9/27*** | (2020.01) |

(52) U.S. Cl.

CPC ........... *G07C 9/00309* (2013.01); *G07C 9/27* (2020.01); *G07C 2209/08* (2013.01)

(58) Field of Classification Search

CPC ... G07C 9/00309; G07C 9/27; G07C 2209/08

See application file for complete search history.

(56) References Cited

U.S. PATENT DOCUMENTS

| | | |
|---|---|---|
| 3,622,995 A | 11/1971 | Dikes et al. |
| 5,999,095 A | 12/1999 | Earl et al. |

(Continued)

FOREIGN PATENT DOCUMENTS

| | | |
|---|---|---|
| CN | 101025806 A | 8/2007 |
| CN | 101299286 A | 11/2008 |

(Continued)

OTHER PUBLICATIONS

Tripathi, A. "Algorithms for Validating E-Tickets in Mobile Computing Environment," Dec. 20, 2007, (Year: 2007).

(Continued)

*Primary Examiner* — Nabil H Syed

(74) *Attorney, Agent, or Firm* — Knobbe, Martens, Olson & Bear LLP

(57) ABSTRACT

A physical location access control system is configured to receive, via a network interface, a request to provide a temporary access right for a first physical location to a first user, the request providing an indication as to a first time period associated with the temporary access right. In response to determining that the requester has an access right to the first physical location for a second time period that comprises the first time period, a temporary access token corresponding to the first time period is created and the requester's access right to access the first physical location for the first time period is disabled. The temporary access token is transmitted to a device associated with the first user, enabling the first user to access the first physical location during the first time period.

26 Claims, 5 Drawing Sheets

Related U.S. Application Data continuation of application No. 18/053,173, filed on Nov. 7, 2022, now Pat. No. 11,741,765, which is a continuation of application No. 17/658,333, filed on Apr. 7, 2022, now Pat. No. 11,501,586.

(60) Provisional application No. 63/362,321, filed on Mar. 31, 2022.

(56) References Cited

U.S. PATENT DOCUMENTS

| | | | |
|---|---|---|---|
| 6,496,809 | B1 | 12/2002 | Nakfoor |
| 6,685,093 | B2 | 2/2004 | Challa et al. |
| 6,842,741 | B1 | 1/2005 | Fujimura |
| 6,854,651 | B2 | 2/2005 | Smith et al. |
| 7,146,645 | B1 | 12/2006 | Hellsten |
| 7,454,361 | B1 | 11/2008 | Halavais |
| 7,693,744 | B2 | 4/2010 | Forbes |
| 8,346,580 | B2 | 1/2013 | Nakfoor |
| 8,624,725 | B1 | 1/2014 | MacGregor |
| 8,775,807 | B1 | 7/2014 | Vazquez |
| 9,070,231 | B1 | 6/2015 | Meyers |
| 9,147,191 | B2 | 9/2015 | Cohen et al. |
| 9,153,082 | B2 | 10/2015 | Martinez |
| 9,600,946 | B1 | 3/2017 | Gerace et al. |
| 9,697,650 | B2 | 7/2017 | Nakfoor |
| 9,876,788 | B1 | 1/2018 | Ziraknejad |
| 9,898,880 | B2 | 2/2018 | Nagisetty |
| 10,109,125 | B1 | 10/2018 | Gerace et al. |
| 10,163,105 | B1 | 12/2018 | Ziraknejad |
| 10,460,538 | B1 | 10/2019 | Gerace et al. |
| 10,643,209 | B2 | 5/2020 | Cohen et al. |
| 10,867,460 | B1 | 12/2020 | Miller |
| 10,878,648 | B1 | 12/2020 | Gerace et al. |
| 10,891,562 | B1 | 1/2021 | Gerace et al. |
| 11,200,306 | B1 | 12/2021 | Singh |
| 11,611,552 | B2 | 3/2023 | Backlund |
| 2001/0051915 | A1 | 12/2001 | Ueno et al. |
| 2002/0169876 | A1 | 11/2002 | Curie |
| 2003/0047613 | A1 | 3/2003 | Funamoto et al. |
| 2003/0105964 | A1 | 6/2003 | Brainard |
| 2003/0110239 | A1 | 6/2003 | Sugumoto |
| 2003/0164400 | A1 | 9/2003 | Boyd |
| 2003/0171960 | A1 | 9/2003 | Skinner |
| 2003/0182242 | A1 | 9/2003 | Scott et al. |
| 2004/0006497 | A1 | 1/2004 | Nestor et al. |
| 2004/0035925 | A1 | 2/2004 | Wu et al. |
| 2005/0021364 | A1 | 1/2005 | Nakfoor |
| 2005/0105734 | A1 | 5/2005 | Buer |
| 2006/0089919 | A1 | 4/2006 | Kidd |
| 2006/0101507 | A1 | 5/2006 | Camenisch |
| 2007/0226055 | A1 | 9/2007 | Belanger |
| 2008/0015983 | A1 | 1/2008 | Spikes |
| 2009/0030744 | A1 | 1/2009 | Yamada |
| 2009/0188983 | A1 | 7/2009 | Walker |
| 2009/0198617 | A1 | 8/2009 | Soghoian |
| 2009/0294539 | A1 | 12/2009 | Kim |
| 2009/0328207 | A1 | 12/2009 | Patel |
| 2010/0023553 | A1 | 1/2010 | Gausman |
| 2010/0082491 | A1 | 4/2010 | Rosenblatt |
| 2010/0198626 | A1 | 8/2010 | Cho et al. |
| 2011/0105154 | A1 | 5/2011 | Kim |
| 2011/0117966 | A1 | 5/2011 | Coppinger |
| 2011/0251862 | A1 | 10/2011 | Deluca |
| 2011/0281652 | A1 | 11/2011 | Laverdiere |
| 2011/0282725 | A1 | 11/2011 | Chatterjee |
| 2012/0091202 | A1 | 4/2012 | Cohen et al. |
| 2012/0185695 | A1 | 7/2012 | Shah |
| 2012/0197797 | A1 | 8/2012 | Grigg |
| 2012/0214515 | A1 | 8/2012 | Davis et al. |
| 2012/0323691 | A1 | 12/2012 | McLaughlin |
| 2013/0090939 | A1 | 4/2013 | Robinson |
| 2013/0185816 | A1 | 7/2013 | Maeda |
| 2013/0262163 | A1 | 10/2013 | Bergdale et al. |
| 2013/0304521 | A1 | 11/2013 | Aird |
| 2013/0325523 | A1 | 12/2013 | Huang |
| 2014/0039945 | A1 | 2/2014 | Coady |
| 2014/0049373 | A1 | 2/2014 | Troy |
| 2014/0100896 | A1 | 4/2014 | Du |
| 2014/0164029 | A1 | 6/2014 | Kwak |
| 2014/0172707 | A1 | 6/2014 | Kuntagod |
| 2014/0240350 | A1 | 8/2014 | Chen et al. |
| 2014/0240469 | A1 | 8/2014 | Lee |
| 2014/0279615 | A1 | 9/2014 | Levin et al. |
| 2015/0142483 | A1 | 5/2015 | Bergdale |
| 2015/0172920 | A1 | 6/2015 | Ben Ayed |
| 2015/0294515 | A1 | 10/2015 | Bergdale |
| 2015/0317466 | A1 | 11/2015 | Kumar |
| 2017/0109753 | A1 | 4/2017 | Woo |
| 2017/0329777 | A1 | 11/2017 | Vlugt |
| 2017/0358148 | A1 | 12/2017 | Kayhani |
| 2018/0261029 | A1 | 9/2018 | Johnson |
| 2020/0090143 | A1 | 3/2020 | Lervolino |
| 2020/0143022 | A1 | 5/2020 | Frost |
| 2020/0209917 | A1 | 7/2020 | Zhou |
| 2020/0294173 | A1 | 9/2020 | Shah |
| 2020/0320576 | A1 | 10/2020 | Harrison |
| 2020/0380229 | A1 | 12/2020 | Peruch |
| 2021/0090082 | A1 | 3/2021 | Cohen |
| 2021/0174373 | A1 | 6/2021 | Nakagawa |
| 2021/0216893 | A1 | 7/2021 | Roden |
| 2021/0357893 | A1 | 11/2021 | Kang |
| 2022/0014526 | A1 | 1/2022 | Burgess |
| 2022/0079439 | A1 | 3/2022 | Heislop |

FOREIGN PATENT DOCUMENTS

| | | | |
|---|---|---|---|
| CN | 106 530 033 | A | 3/2017 |
| CN | 103415858 | B | 3/2018 |
| DE | 100 34 275 | A1 | 1/2002 |
| EP | 3293995 | A1 | 3/2018 |
| JP | 2001-256513 | A | 9/2001 |
| JP | 2001-319186 | A | 11/2001 |
| JP | 2002-109343 | A | 4/2002 |
| JP | 2002-123730 | A | 4/2002 |
| JP | 2002-344444 | A | 11/2002 |
| JP | 2004-295650 | A | 10/2004 |
| KR | 10-2003-0022630 | A | 3/2003 |
| KR | 10-2004-0021165 | A | 3/2004 |
| KR | 10-0592411 | B1 | 6/2006 |
| WO | WO 94/10658 | | 5/1994 |
| WO | WO 2012/096749 | A2 | 7/2012 |
| WO | WO 2018/074504 | A1 | 4/2018 |
| WO | WO 2021/214134 | A1 | 10/2021 |

OTHER PUBLICATIONS

Balaban, D. "German football charges forward with e-ticketing." Card Technology, 10(10), 18-22. Retrieved from https://dialog.proquest.com/professional/docview/198546689?accountid= 131444 (Year: 2005).

Canadian Preliminary Review regarding Canadian Application No. 2577118, dated Jan. 25, 2019, 12 pages.

European Office Action, from EP Application No. 11855858.4, dated Oct. 4, 2019.

Extended European Search Report, dated Oct. 27, 2023, received in European Patent Application No. 23164971.6, in 16 pages.

International Preliminary Report on Patentability and Written Opinion of the International Searching Authority for PCT/US2011/064807, "Mobile Application Bar Code Identification and System", dated Jul. 25, 2013.

Karaiskos et al., "User Acceptance of Pervasive Information Systems: Evaluating an RFID Ticketing System," ECIS 2007 Proceedings 4, retrieved from https://aisel.aisnet.org/cgi/viewcontent.cgi?article=1192&context=ecis2007 (Year: 2007).

Notification of Transmittal of The International Search Report and The Written Opinion of the International Searching Authority, or the Declaration for International Application No. PCT/US2011/064807, date of mailing Jul. 24, 2012, 9 pages (Our Docket No. 4076.1002-002).

Office Action dated Jan. 5, 2004, received in Australian Patent

(56) References Cited

OTHER PUBLICATIONS

Application No. 2023201979, in six pages.
Partial European Search Report dated Jul. 28, 2023, received in European Patent Application No. 23164971, in 15 pages.
Supplementary European Search Report for EP Application No. 11855858.4; dated Mar. 29, 2017; Flash Seats, LLC; 9 pages.
Canadian Office Acation, Regarding Application No. 3,193,323, entitled "Systems and Methods for Providing Temporary Access Credentials to Access Physical Locations," mailed Aug. 15, 2024, 4 pages.
Office Action dated Oct. 9, 2024, received in New Zealand Patent Application No. 798395, in 3 pages.
European Office Action, Regarding Application No. 23 164 971.6-1218, dated Feb. 28, 2025, 10 pages.
Australian Office Action regarding Application No. 2024267114, dated Jan. 20, 2026, 5 pages.

SYSTEMS AND METHODS FOR PROVIDING TEMPORARY ACCESS CREDENTIALS TO ACCESS PHYSICAL LOCATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Field

The present disclosure generally relates to systems and methods for providing access to physical locations.

Description of the Related Art

Electronic access control for physical locations has become ever more important in providing efficient user access while at the same time ensuring location safety by excluding non-authorized persons from the location.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates a physical location access control system configured to receive via a network interface, a request from a requester to provide a temporary access right for a first physical location to a first user, the request providing an indication as to a first time period associated with the temporary access right and determine whether the requester has an access right to the first location for a second time period that comprises the first time period. In response to determining that the requester has an access right to the first physical location for a second time period that comprises the first time period, a temporary access token corresponding to the first time period is created and the requester's access right to access the first physical location for the first time period is disabled. The temporary access token is transmitted to a device associated with the first user, enabling the first user to access the first physical location during the first time period.

An aspect of the present disclosure relates to a physical location access control system, including: a network interface; at least one processing device operable to: receive, via the network interface, a request from an access controller to provide a temporary access right for a first physical location to a first user, the request providing an indication as to a first time period associated with the temporary access right; determine whether the access controller is permitted to provide the temporary access right for the first physical location to the first user for the first time period; at least partly in response to determining that the access controller is permitted to provide the temporary access right for the first physical location to the first user for the first time period: create a temporary access record corresponding to the first time period; disable the access controller's access right to access the first physical location for the first time period; transmit a message corresponding to the temporary access record to a destination associated with the first user; and enable the first user to access the first physical location during the first time period, optionally in an absence of a token corresponding to the temporary access right.

An aspect of the present disclosure relates to a computer-implemented method, the method including: receiving at a computer system, via a network interface, a request from an access right controller that has a set of access rights including a recallable first access right associated with a first physical location to provide the recallable first access right to a first user, wherein the recallable first access right is recallable by the access right controller during a first time period; at least partly in response to the request from the access right controller: recording an indication in a database regarding a provision of the recallable first access right to the first user, and disabling the access right controller's ability to utilize the recallable first access right associated with the first physical location; receiving, over the network, a recall request regarding the first access from the access right controller; determining whether the recallable access right is currently recallable; at least partly in response to determining that the recallable access right is currently recallable: recording an indication in a database regarding the recall of the recallable first access right and enable the access right controller to utilize the recallable first access right associated with a first physical location, and disabling the first user's ability to utilize the recallable first access right associated with a first physical location.

An aspect of the present disclosure relates to non-transitory computer readable memory that stores instructions, that when executed by a computer system comprising one or more computing devices, cause the computer system to perform operations including: receive at a first time a request from a requester to provide a recallable access right for a first physical location for a first event to a first user; determine whether the requester is permitted to provide the recallable access right for the first physical location for the first event to the first user; at least partly in response to determining that the requester is permitted to provide the recallable access right for the first physical location for the first event to the first user: create an access provision record corresponding to the provision of the recallable access right to the first event to the first user; disable the requester's access right to access the first physical location for the first event; transmit a message corresponding to the access provision record to a destination associated with the first user; and enable the first user to access the first physical location for the first event, optionally in an absence of a token corresponding to the recallable access right.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1A:
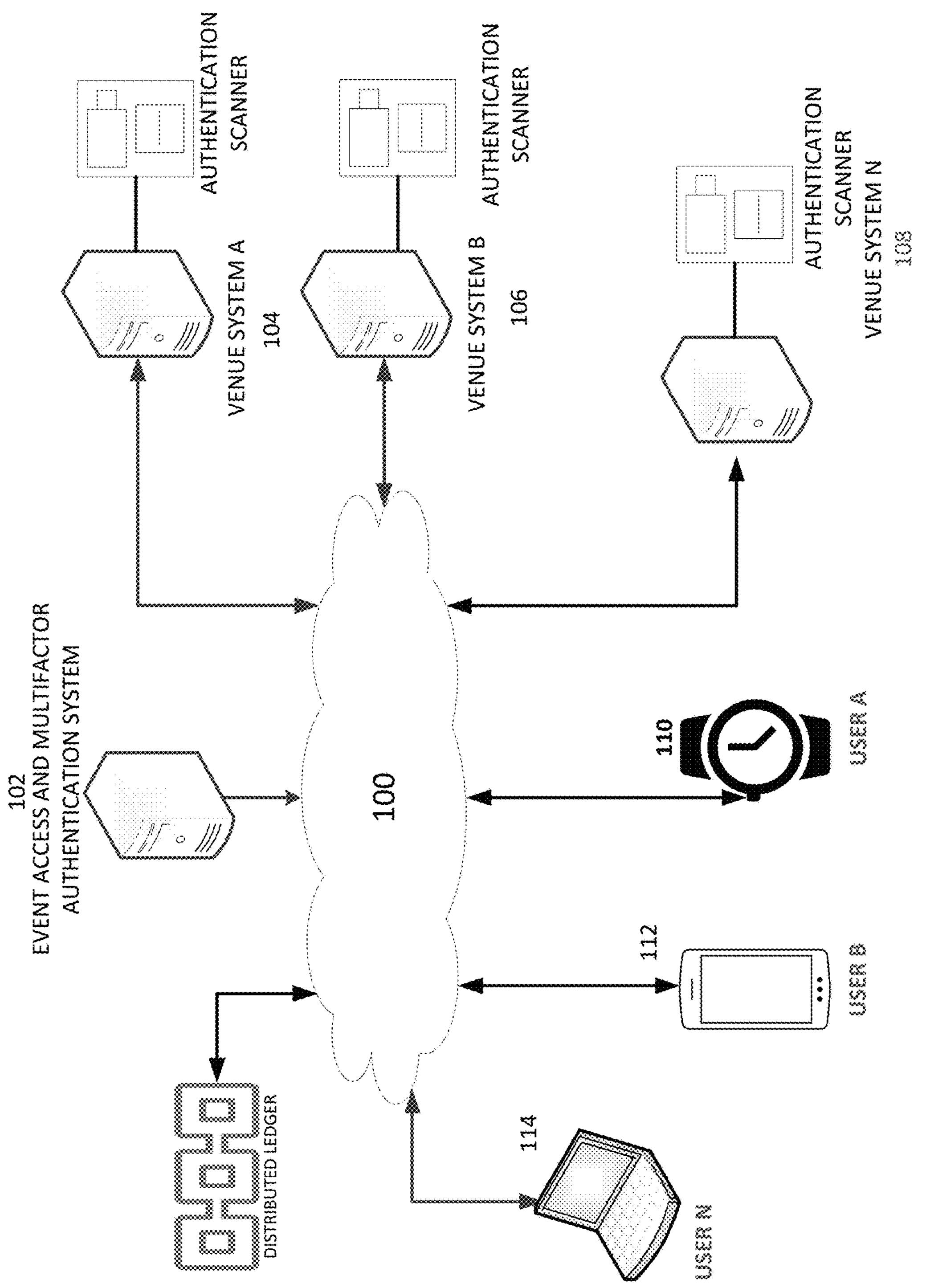
FIG. 1A illustrates an example networked environment architecture.

An aspect of the present disclosure relates to methods and systems for providing dynamic and temporary access to resources, such as physical locations, for specified periods of time and/or specified events. A digital access rights locker may be utilized to store data indicating a user's access rights to physical locations, physical objects, and/or other rights, and the status of such rights.

A given access right may include sub-access rights to physical locations, physical objects, and/or other rights. For example, a top tier access right may provide a user with access rights to multiple related events at one or more physical locations/venues (e.g., for a season subscription for multiple events, such as multiple concerts or multiple sporting events). Sub-tier access rights may be for a single event within the multiple events (e.g., a single sporting event, where the transferring or lending user has season tickets that include a ticket to the single sporting event) at a single physical location and/or the sub-tier access rights may include access rights for a specified time period (with a start and/or stop date/time) that may include one or more events at one or more physical locations. A sub-sub-tier access right may be for a portion of one event at a physical location or for an access right to special restricted area (e.g., a restaurant or a VIP section) within a physical location for a given event.

A user (who may be referred to as an access control owner or access controller) may be enabled to lend/transfer one or more access rights (e.g., a top tier access right, a sub-tier access right, a sub-sub-tier access right, and so one) to another user (who may be referred to as the recipient or receiving user).

Thus, for example, the transfer or loan of an access right may be associated with a start time (which may be a date and optionally a specific start time on that date) and an end time. Optionally, the transfer or loan of an access right may be associated with a start time (which may be a date and optionally a specific start time on that date) and without an end time, but where the access credential owner may withdraw such transfer at any time or in compliance with specified withdrawal rules. Optionally, the transfer or loan of an access right may be associated with a start event (which may be a specified event in a season, such as a sports season) and an end event (which may be a specified subsequent event in the season), and may include all intervening events). Optionally, the transfer or loan may include multiple access rights for a given event (e.g., multiple tickets for the event that may be used by multiple attendees). Thus, the transfer or loan of certain access rights may be temporary in nature and may be in the form of a loan of access rights. Optionally, the access control owner may be enabled to retrieve any lent rights at any time. Optionally, the access control owner may be inhibited from retrieving certain or any lent rights. For example, optionally the access right owner may be prevented from recalling a lent access right once it has been lent. However, the recipient of the access right may elect to return the lent access right (e.g., in response to a request from the access right owner).

As noted above, a given access right may be to an event (e.g., a musical performance, a sporting event, a movie, a play, an art exhibit, etc.), such as a ticketed event, at a physical location, such as a venue (e.g., a stadium, a concert hall, a theater, a field, etc.). Further, the access right may be to a specific location within the venue, such as a specific seat (e.g., associated with a seating section, row, and seat number) and/or a VIP section. However, in addition or instead, an access right might be to a physical item, such as a food or clothing item.

Advantageously, such access rights may optionally be transferred or lent without requiring a transfer or loan of an access credential or key to a receiving user device or electronic address (e.g., an email address, a messaging address, or other such address) or the printing of a physical ticket. Because a given access right is transferred or lent without requiring a transfer or loan of an access credential or key to a receiving user device or electronic address, the security of such access rights is greatly enhanced as there is no opportunity to intercept or misappropriate such access right.

Instead, the transfer or loan is optionally recorded in the digital access rights locker, which may optionally be in the form of a database record maintained by an access control system. As will be described, optionally the access control system may utilize a distributed, synchronized database to store the record. The database record may include an identifier associated with the access right owner (e.g., a user that originally purchased or owns the tickets), and that of any recipients of a transfer or lending of an access right from the access right owner. For example, a given access right may be associated with a logical toggle indicating whether the access right owner has retained use of the given access right or if the access right owner has transferred or lent the given access right to a recipient. If the toggle indicates that the given access right has been transferred or lent, a corresponding recipient identifier may be stored in association with toggle. Thus, a recipient of an access right may be enabled to utilize the access right (e.g., to gain admission to an event) even in the absence of bearing an access right token, such as a physical or electronic ticket. At the same time, the access right's owner ability to utilize the access right may be disabled.

As noted above and discussed elsewhere herein, optionally the access right owner may recall a given access right lent to another user. Optionally, if the access right owner has not recalled a given lent or transferred access right, the access right owner may be inhibited from using the lent or transferred access right. For example, if the access right owner presents credentials or biometrics in order to access an event for which the access right owner has lent the corresponding access right, the disclosed system may use the presented credentials or biometrics to access the access right owner's record. The system may then determine from the access right owner's record that the access right has been lent out and may transmit an instruction to an indicator (e.g., an indicator display and/or sound emission device) at the event venue to present an indication that the access right owner is to be denied entry. Optionally, if the access right owner recalls the lent access right, a determination may be made as to whether the recipient of the lent access right has already used the access right to access the venue. If a determination is made that the recipient of the lent access right has already used the access right to access the venue, the access right owner may be inhibited from recalling the access right and may be inhibited from entering the event venue.

By way of example, if a determination is made that the recipient of the lent access right has not yet used the access right to access the event venue, the access right owner may be permitted to recall the access right and may be permitted to enter the event venue. If a determination is made that the recipient of the lent access right has used the access right to access the event venue, the access right owner may be inhibited from recalling the access right and may be inhibited from entering the event venue. By way of further example, if a determination is made that the time period before an event to which the lent access right grants access is greater than a specified threshold period of time, the access right owner may be permitted to recall the lent access right. If a determination is made that the time period before an event to which the lent access right grants access is less than a specified threshold period of time, the access right owner may be inhibited from recalling the lent access right and may be inhibited from entering the event venue.

The recall of the access right may be recorded via a toggle in the corresponding database record. A notification may be transmitted to the recipient of the lent (and now recalled) access right indicating that the access right has been recalled and may no longer be used by the recipient. For example, the notification may be transmitted to an electronic address associated with the recipient (e.g., an email address, a messaging service address) and/or presented in an application configured to provide access rights. In addition, the recipient may be inhibited from entering the event venue using the lent access right. For example, the system may determine from the access right owner's record that the access right has been recalled, and the system may transmit an instruction to an indicator display at the event venue to present an indication that the recipient is to be denied entry.

By way of illustration, an attendee and/or a device associated with attendee may be identified at a physical location. For example, the attendee may be identified using biometrics (e.g., a fingerprint, a face print data, an iris print, and/or the like), optical indicia (e.g., an optical code, such as a QR code, or other barcode or the like) displayed on a user device, audible indicia generated by a speaker of an attendee device, a radio frequency signal from the attendee device, and/or otherwise. By way of example, the attendee device may be smart phone, a wearable computing device (e.g., a smart watch, a smart badge, smart glasses, smart clothing, smart jewelry, etc.), a tablet computer, or other portable computing device or token.

Once the attendee is identified, access rights, including corresponding access rights owned by the attendee, or transferred or lent to the attendee may be retrieved, and a determination may be made as to whether the owned, transferred, or lent access rights (if any), entitles the attendee to gain access to the physical location at the current time (e.g., for a current event). In response to determining that the owned, transferred, or lent access rights (if any), entitles the attendee to gain access to the physical location at the current time (e.g., for a current event), a signal may be generated that enables the attendee to access the physical location.

As similarly described elsewhere herein, the signal may be used to provide a human perceptible "access permitted" indication in the form of a visible light indicator, an audible sound, and/or haptic feedback. In addition or instead, the signal may cause a barrier to be unlocked and/or opened providing the attendee access to the physical location.

Optionally, multifactor authentication comprising multi-credential and geographical location verification may be used to verify a given attendee has received a given access right at a given physical location. Multifactor authentication enhances security as two or more credentials of different types are needed to access a resource (e.g., admission to a site, such as an event venue). As described, optionally the credentials may include a unique user identifier and a unique user device identifier, which may need to be presented at a specific geographical location (e.g., a venue or a specific set of venue entryways, such as entryways to seating areas).

A user may acquire, transfer or loan, or receive a transfer or loan of event access rights for one or more attendees. Optionally, as similarly discussed above, rather than providing a user with a physical ticket or a downloaded ticket or access token stored on a user device, a user right to access a site (e.g., an event venue) may be performed using multifactor authentication, where advantageously the user device does not need to be connected to a network when the multifactor authentication is performed. For example, a user right to access a venue (or a portion of thereof) for an event may optionally be performed by authenticating a user device and a user at a specific location (e.g., an event venue or a subset of venue/seating area entrances).

For example, an application configured to enable a user to access events at venues may be downloaded from an application store (sometimes referred to as an app store) or other source and installed on the user device. Optionally the same application may be used to manage electronic tokens. For example, the application may include access to a wallet (sometimes referred to herein as a logical storage module) configured to store fungible tokens (sometimes referred to herein as non-unique digital elements of NDEs) and non-fungible tokens (sometimes referred to herein as unique digital elements or UDEs). The user may register an account with an access control system configured to manage and control event access. The user account may include authentication credentials, such as a unique identifier associated with the user and/or a unique identifier associated with the user device. The unique identifier associated with the user device may optionally be an identifier other than or in addition to a phone number associated with the user device to thereby make it more difficult to mimic. The unique user device identifier, optionally used in performing multifactor authentication, may or may not be assigned to the user device by the access control system.

For example, the user device identifier may include one or more of an International Mobile Equipment Identity (IMEI) 14 digit number, a Unique Device ID (UDID) comprising a 40-digit sequence of letters and numbers, a serial number, an ID for Advertisers (IDFA), or a Google Advertiser ID (GAID). Optionally, the access control system may embed a unique identifier in the application downloaded to the user device which may then be used as the unique device identifier.

The unique user identifier (optionally used in multifactor authentication) may or may not be assigned to the user by the access control system. For example, the user may provide a user identifier, and the system may search its database of user identifiers. If the system detects that the user identifier is associated with another user or user account, the user may be instructed by the system to select a different user identifier. This process may repeat until the user specifies what is determined to be a unique user identifier. Optionally, in addition or instead, the system may generate a unique user identifier and may transmit the assigned unique user identifier to the user device. The application hosted on the user device may access the unique device identifier and use it during the authentication/verification processes described herein. Optionally, the application hosted on the user device and may or may not present the unique user device identifier and/or user identifier to the user in human readable form (using alphanumeric or ASCII characters). Thus, the user may be unaware of the actual values of the user device identifier and/or user identifier.

When the user arrives at a venue entrance (which may be an initial entrance to a venue building or area, or may be an interior entrance to a specific seating or other area within the venue, such as a VIP area), the user device may present the unique user device identifier and/or user identifier to a venue scanner, optionally encoded (e.g., encrypted and converted from the digital realm to an optical, radiofrequency, and/or audio representation). For example, the user device may (e.g., via the application hosted on the user device) present the unique user device identifier and/or user identifier, as well as a timestamp of the current time, encoded in a visual indicia (e.g., a barcode, such as a QR code or linear barcode), encoded in an electronic signal (e.g., via Bluetooth, Wifi, NFC, or the like), and/or encoded in an audio signal. The timestamp will prevent a user from taking a screenshot or other recording of the presented data, forwarding the screenshot or other recording to another user device so that the other user may attempt to use the screenshot or other recording to gain access to the event, as the timestamp in the screenshot or other recording will likely no longer reflect the current time.

The user device application may periodically (e.g., every 5, 10, 15, or 30 seconds) refresh the presented data to update the timestamp to about the current time. The unique user device identifier and/or user identifier, (and optionally the timestamp) may be encrypted using a hash code, using symmetric encryption, using asymmetric encryption, or otherwise.

For example, Advanced Encryption Standard (AES), a symmetric encryption algorithm that encrypts fixed blocks of data (of 128 bits) at a time, may be used. AES utilizes a substitution-permutation network and may have a fixed block size (e.g., 128 bits), and a key size of 128, 192, or 256 bits.

By way of further example, Rivest-Shamir-Adleman (RSA) encryption/decryption techniques may be utilized. RSA is a public-key cryptosystem, where the encryption key is public and where a decryption key is kept private. An RSA user may create and publishes a public key (based on large prime numbers and an auxiliary value, where the primate numbers are kept private/secret). Data can be encrypted by anyone, via the public key, but can only be decoded by someone who knows the private key (the prime numbers). By way of yet further example, triple DES (Data Encryption Standard) encryption/decryption techniques may be utilized (optionally in conjunction with AES). Triple Data Encryption Standard (DES) applies block cipher algorithms three times to each data block. Each block contains 64 bits of data. Three keys are referred to as bundle keys with 56 bits per key. In certain forms of DES, all keys may be independent, two of the three keys may be independent, or all three keys may be identical (triple DES). The triple DES key length contains 168 bits and the key security may be 112 bits. By way of yet further example, a hash function may be utilized. Hashing changes a plain text or a key to a hashed value by applying a hash function. Optionally, the input length is greater in size than the output hash value. Hashing provides a one-way encryption process such that a hash value cannot be reverse engineered to get to the original plain text or key.

Thus, the venue scanner may be equipped with a camera, a laser scanner, a radio frequency receiver, a palm scanner, a microphone device, and/or other device for receiving the unique user device identifier and/or user identifier.

A timestamp may also be generated by the venue scanner and/or access control system (or other system) corresponding to when the unique user device identifier and/or user identifier, and timestamp were received by the venue scanner and/or access control system. The venue scanner may directly or via the access control system (or other system) decrypt the encrypted unique user device user identifier, and/or timestamp, and may compare the timestamp received from the user device with that generated by the venue scanner and/or system. If the timestamps fail to match (e.g., exactly match or match within a certain range of time, such as 1-15 seconds), the venue scanner or system may indicate an authentication failure.

If the timestamps are determined to match, the venue scanner may directly or via the access control system compare the unique user device and/or user identifier (or a hash thereof) to those in a user database. If the unique user device and/or user identifier (or a hash thereof) match those of a user account, a determination may be made as to whether the user account is associated with one or more access rights to the event. Where a hash is used, the hash may be, by way of example, a MD5, SHA-1, SHA-256, or other hash. If the user device and/or user identifier are encrypted using a public key associated with the system (where asymmetric encryption is employed), a private key may be used to decrypt the user device and/or user identifier. If the user device and/or user identifier are encrypted using symmetric encryption, the key used to perform the encryption may be used to perform the decryption.

A transferred or lent access right may be encoded in a token. The access right token may include data identifying the access right controller that is lending the access right, identifying the right transferred or lent (e.g., an access right to an event, to a location, an associated start time, an associated end time, and/or an associated time period), data indicating the status of the access right (e.g., transferred, lent, recalled, etc.), and/or data identifying the receiving user. The access right data may be encrypted using a public key, and may be decrypted using a private key, such as the keys discussed elsewhere herein.

As similarly discussed elsewhere herein, by way of example, a transferred or lent access right may be for a specific event, for all events within a specified time period, for all events beginning at a specified start time and until such access right is withdrawn, or for a first event and a specified subsequent event, and for all events between the first event and the subsequent event. Thus, once a user and/or a user device are identified at a physical location, a determination may be made as whether a current event at the physical location at which the user and/or user device were identified corresponds to a transferred or lent access right specifically for the current event, or falls within a time period for which access rights were transferred or lent to the user, falls after a time period for which access rights were transferred or lent to the user and before a withdrawal of such access rights has occurred, or fails within a first specified event, a subsequent specified event, or events between the first specified event and the subsequent specified event.

If a determination is made that the user account is associated with one or more access rights to the event (e.g., an access right transferred or lent by another user as discussed herein), a corresponding authentication/verification indication may be provided via a device at the venue entrance (e.g., a display device, a sound generating device, a gate that opens, and/or the like) and the user may access the event venue. For example, the authentication/verification success indication may comprise the illumination of a light of a certain color (e.g., green), text (e.g., "authentication approved"), a graphic (e.g., a thumbs-up symbol), and/or a sound (e.g., a bell sound). Optionally, the number of access rights that the user has is presented via a display of the venue. For example, a user may have access rights for the user and certain user friends. Optionally, in response to a successful authentication/verification a solenoid, stepper motor, or other electro or electro-mechanical device may be activated to unlock/open a barrier to admit the user (and one or more other users) into a venue.

If a determination is made that the user account is not associated with one or more access rights to the event (e.g., purchased right or a transferred or lent access right), a corresponding authentication/verification failure indication may be provided via a device at the venue entrance (e.g., a display device, a sound generating device, a gate that closes or remains closed, and/or the like). For example, the authentication/verification failure indication may comprise the illumination of a light of a certain color (e.g., red), text (e.g., "authentication failed"), a graphic (e.g., a prohibition symbol), and/or a sound (e.g., a boing sound).

Optionally, in order for a determination to be made that the user is to be authenticated/verified as having access rights to the event or to a given venue entrance, an identifier associated with the event venue scanner needs to be received (e.g., in association with the user identifier and the user device identifier) and verified. For example, a user's access rights stored by the system may indicate which venue entrances a user is entitled to pass through (and explicitly or inferentially indicate which venue entrances a user is not entitled to pass through). Thus, even if the user identifier, user device identifier, and timestamp are verified, if the user does not have access rights to the venue entrance as which the user device was scanned, optionally a corresponding notification may be provided to a venue operator and/or the user, and the user may be denied entrance. The notification may optionally indicate which venue entrances the user is entitled to access. This optionally ensures that a user will be provided access rights to certain seating areas of an event venue that the user is entitled to, and is not granted access to an entrance providing admissions to seating areas the user does not have access rights to.

Optionally, in addition to or instead of one or more of the foregoing authentication techniques (e.g., using a unique user identifier assigned to or provided by the user, a unique device identifier, and/or a venue authentication scanner identifier), biometric authentication may be provided. For example, a camera may be utilized to capture an image of a user device which may be used to authenticate a user. By way of further example, a fingerprint reader may be used to read a user's fingerprint for authentication purposes. By way of yet further example, an iris reader may be used to capture a user's iris for authentication purposes. By way of yet further example, a palm scanner may be utilized that is configured to emit infrared or near infrared light to capture a user's vein pattern. The biometric readings of the user may be compared to stored user readings (which may be associated with a corresponding user identifier and device identifier), and if a match is not found, a verification failure indication may be provided as similarly discussed above.

Thus, a user can be authenticated, optionally using multifactor authentication, and the user right to access an event determined at a venue via a user device, where the user device does not have a ticket or the like downloaded to the user device, and even where the user device does not have Internet access at the venue. The multifactor authentication may, for example, include two or more of a unique user identifier, a unique user identifier, a timestamp, a biometric reading, or a geographical location of the user (e.g., where the unique user identifier, the unique user identifier, the biometric reading, and/or the timestamp need to be verified at a specific location, that is, an event venue).

Optionally, a transfer or loan of access rights from one user to another user may be recorded in a tamper-resistant or tamper-proof database. Optionally, the database may be publicly accessible. Optionally, a record of an access right transfer or loan may be stored on a distributed database that is synchronized and accessible across different sites and geographies by multiple participants (e.g., a distributed digital ledger, such as a blockchain). The record may include user identifiers and the current states of access rights (e.g., have they been loaned, for how long they have been loaned, etc.).

Optionally, the access right transfer or loaned may be stored on a distributed digital ledger (e.g., on a distributed, synchronized database) in the form of a smart contract in the form of computer code that can run on the distributed, synchronized database. Thus, transactions that happen in a smart contract may be processed by the distributed, synchronized database and may only occur when conditions specified in the smart contract are met. For example, a smart contract may comprise "if/when . . . then . . . " statements that are written into code on a blockchain. A network of computer systems may execute the actions when predetermined conditions have been met and verified. The corresponding transaction records may be encrypted making it highly challenging for a hacker to access such transaction records.

For example the distributed synchronized database may store a block or a reference to a block that includes some or all of the following: data identifying the access right controller that is lending the access right, data identifying the right transferred or lent (e.g., an access right to an event, to a location, an associated start time, an associated end time, and/or an associated time period), data indicating the status of the access right (e.g., transferred, lent, recalled, etc.), and/or data identifying the receiving user. The access right data may be encrypted using a public key, and may be decrypted using a private key, such as the keys discussed elsewhere herein.

For example, a user interface may be presented to the access control owner (e.g., via a dedicated application, such as a phone app, or via a webpage presented via a browser) that lists access rights (e.g., event tickets, rights to VIP locations, rights to food or merchandise, etc.) that the access right owner possesses, and their current status (e.g., loaned out, recalled from a loan, transferred out, or at a default state (e.g., never loaned, recalled or transferred)). In response to the access control owner selecting a given access rights, various attributes associated with the selected access right may be presented (e.g., available lending periods, sub-tier rights available for lending, etc.). The user interface may enable the access right owner to specify the parameters associated with a loan of the access right (e.g., start time, end time, other parameters discussed herein, and/or the like). A field may be provided via which the access right owner can specify to whom the access right is to be loaned to in accordance with the specified parameters. For example, the recipient of the loaned access right may be specified via an electronic address associated with the recipient (e.g., an email address, a messaging service address, or other electronic address).

Optionally, there may be system-implemented access right lending rules that control which access rights may be loaned, when a given access right may be loaned, for how long a given access right may be loaned, how many access rights may be loaned at a given time, how many access rights may be loaned over a given time period (e.g., in month, in a year, etc.), how frequently a given access right may be loaned, how many access right loans may be recalled over a given time period, and/or the like. The user interface via which an access right owner can select an access right to loan and corresponding loan parameters may be populated by the system to indicate which access rights may currently be loaned, which access rights may not currently be loaned, which loan parameters may be selected for a given access right, and/or which loan parameters may not be selected for a given access right. For those access rights that may not be currently loaned, the system may determine, using the access right owner's historical loans and/or on the access right lending rules, when the access right owner will be enabled to lend the access right. The system may populate the user interface with an indication as to the date and/or other conditions than need to be satisfied in order for the access right owner to be enabled to loan the access right.

Optionally, an access right owner may be provided by the system with a fungible and/or non-fungible token as memorabilia or other benefit for a loaned out access right. For example, the token may comprise an image of a ticket for the corresponding event for which the access right was loaned out, an image of a performer at the event for which the loaned access right granted access, a graphic, cryptocurrency or other item. Optionally, the grant of the token may occur in response to one or more conditions being satisfied. For example, a token may be granted substantially immediately in response to the loan of the access right. By way of further example, a token may be granted in response to the recipient of the access right utilizing the access right. By way of further example, a token may be granted in response to determining that the access right can no longer be recalled by the access right owner.

Certain aspects will now be described with reference to the figures.

FIG. 1A illustrates an example networked environment that may be utilized to practice the example processes herein. An access control system 102 may communicate via a network 100 (e.g., the Internet, an intranet, a cellular network, and/or other network) with one or more venue systems 104, 106, 108 which may be located at (or may have components located at) one or more respective venues.

For example, a given venue system many have a corresponding authentication scanner located at a venue entrance (which may be an entrance to a venue building or may be an entrance with a building to a restricted area). A given authentication scanner may include, by way of example, one or more of: a camera configured to capture an image of a user and/or barcode (e.g., a 1D or 2D barcode, such as a QR code) for authentication purposes, a barcode scanner (e.g., a laser barcode scanner configured to scan barcodes), a radio frequency receiver configured to receive a wireless transmission comprising authentication data from user devices, a microphone configured to receive an audible signal comprising authentication data from a user device (e.g., user devices 110, 112, 114), a biometric reader (e.g., a fingerprint reader, an iris reader, a palm reader, and/or the like), and/or other device for receiving the unique user device and/or user identifier. A given venue system may include a network interface configured to communicate with the multifactor authentication system 102 and optionally other systems via the network 100.

The access control system 102 may be configured to store and provide access to two dimensional and/or three dimensional venue seating charts and event information. For example, the event information may include, for a given event, an event date, an event name (e.g., a name of a performer, a name of a tour, names of teams at a sporting event), an event venue, access token prices for event venue seats/sections, an indication as to which seat access tokens have been sold and which are available. The access control system 102 may store user account information including some or all of the following: a user name, a user email address, a user phone number/SMS/text messaging address, a user avatar (which may be selected by a user among content associated with the user's UDEs), geographical information (e.g., physical address, zip code, city, etc.) a unique user identifier (e.g., an alphanumeric identifier, fingerprint data, face print data, iris print data, and/or the like), a unique user device identifier, event identifiers corresponding to events the user has access rights (including sub-tier rights) to, access rights loaned out by the user (optionally including the date of the loan, an identification of the event for which the access right grants access to, an identification of the event venue, an identification of the event date, an identification of the recipient of the access right loan), access rights loaned to the user (optionally including the date of the loan, an identification of the event for which the access right grants access to, an identification of the event venue, an identification of the event date, an identification of the grantor of the access right loan), loaned-out access rights recalled by the user (optionally including the date of the recalled loan, an identification of the event for which the recalled access right grants access to, an identification of the event venue, an identification of the event date, an identification of the recipient of the access right loan), user preferences (e.g., favorite performers, favorite venues, favorite musical styles, etc.), UDEs transferred to the user (including an identifier that enables the UDE to be located on a synchronized distributed database), UDEs re-transferred by the user to another person, fees paid for UDEs, unique UDE/cryptocurrency e-wallet identifier, and/or other user-related data disclosed herein.

The access control system 102 may be configured to authenticate a user using authentication data scanned by a venue authentication scanner as similarly discussed elsewhere herein. For example, the access control system 102 may use multifactor authentication in identifying and authenticating a user.

The access control system 102 may also be configured to implement access right lending rules that control which access rights may be loaned, when a given access right may be loaned, for how long a given access right may be loaned, how many access rights may be loaned at a given time, how many access rights may be loaned over a given time period (e.g., in month, in a year, etc.), how frequently a given access right may be loaned, how many access right loans may be recalled over a given time period, and/or the like. The access control system 102 may also be configured to populate user interfaces described herein.

The access control system 102 may also be configured to: implement UDE allocation rules; rules that control a user's rights to sell, exchange, or otherwise transfer UDEs; and/or rules that control the conversion of a non-unique digital element to a unique digital element. For example, the access control system 102 may be configured to implement the rules and allocation processes described elsewhere herein.

The access control system 102 may be configured to record UDEs on a distributed ledger 116 (e.g., a blockchain or other synchronized distributed database). The synchronized distributed database 116 may be a public or private synchronized distributed database. A UDE may represent an access right, an image (e.g., a photograph, a video, a graphic, digital artwork, etc.), a sound file, and/or text. The UDE may be utilized to establish a verified and public proof of ownership of whatever rights were provided to the user to the content represented by the UDE (e.g., a license to use, copy, display the underlying content asset; the right to transfer sell, transfer, or exchange the UDE, etc.).

Figure 1B:
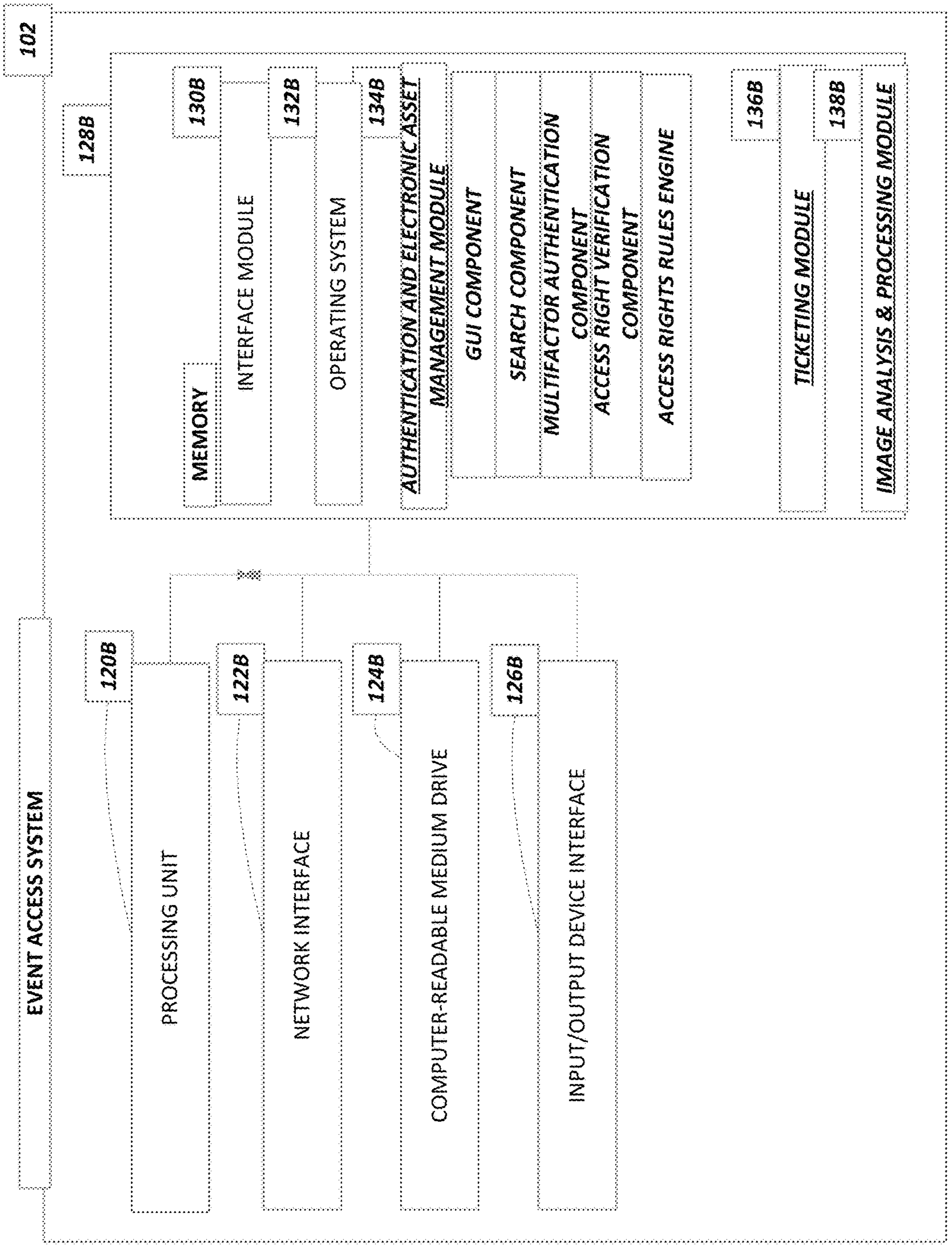
FIG. 1B illustrates an example system architecture.

FIG. 1B is a block diagram illustrating example components of the access control system 102. The example access control system 102 includes an arrangement of computer hardware and software components that may be used to implement aspects of the present disclosure. Those skilled in the art will appreciate that the example components may include more (or fewer) components than those depicted in FIG. 1B. The access control system 102 may comprise a cloud-based computer system.

With respect to the cloud-based computer system, the cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage).

The access control system 102 may include one or more processing units 120B (e.g., a general purpose process and/or a high speed graphics processor), one or more network interfaces 122B, a non-transitory computer-readable medium drive 124B, and an input/output device interface 126B, all of which may communicate with one another by way of one or more communication buses. The network interface 122B may provide services described herein with connectivity to one or more networks or computing systems (e.g., venue systems, user device, distributed ledgers, event promoters, seating chart visualization systems, etc.). The processing unit 120B may thus receive information (e.g., access token purchases, verification/authentication data, verification/authentication requests, etc.) and instructions from other computing devices, systems, or services via a network, and may provide responsive data and/or execute instructions. The processing unit 120B may also communicate to and from memory 124B and further provide output information via the input/output device interface 126B. The input/output device interface 126B may also accept input from one or more input devices, such as a keyboard, mouse, digital pen, touch screen, microphone, camera, etc.

The memory 128B may contain computer program instructions that the processing unit 120B may execute in order to implement one or more aspects of the present disclosure. The memory 128B generally includes RAM, ROM (and variants thereof, such as EEPROM) and/or other persistent or non-transitory computer-readable storage media. The memory 128B may store an operating system 132B that provides computer program instructions for use by the processing unit 120B in the general administration and operation of an authentication and electronic asset management module 134B, including its components.

The memory 128B may store user accounts, including a user name, a user email address, a user phone number/SMS/text messaging address, other electronic destinations, geographical information (e.g., physical address, zip code, city, etc.) a unique user identifier (e.g., an alphanumeric identifier, fingerprint data, face print data, iris print data, and/or the like), a unique user device identifier, event identifiers corresponding to events the user has access rights to, hashes of user device and/or user identifiers, user preferences (e.g., favorite performers, favorite venues, favorite musical styles, other preferences discussed herein, and/or the like), payment instrument data, and/or other user data described herein.

The memory 128B may store may also store event, access token, and venue information, such as discussed elsewhere herein. The memory 128B may store in a user record and/or elsewhere an identification of access rights loaned out by the user (optionally including the date of the loan, an identification of the event for which the access right grants access to, an identification of the event venue, an identification of the event date, an identification of the recipient of the access right loan), access rights loaned to the user (optionally including the date of the loan, an identification of the event for which the access right grants access to, an identification of the event venue, an identification of the event date, an identification of the grantor of the access right loan), loaned-out access rights recalled by the user (optionally including the date of the recalled loan, an identification of the event for which the recalled access right grants access to, an identification of the event venue, an identification of the event date, an identification of the recipient of the access right loan), Some or all of the data and content discussed herein may optionally be stored in a relational database, an SQL database, a NOSQL database, or other database type. Because the content elements may include BLOBs (binary large objects), such as large images (e.g., still photographs, videos, multilayered graphics) which may be difficult for conventional database to handle, some (e.g., BLOBs) or all of the content elements may be stored in files and corresponding references may be stored in the database. Optionally, the memory 128B may include one or more third party cloud-based storage systems.

The authentication and electronic asset management module 134B may include a GUI component that generates and/or populates graphical user interfaces and processes user inputs, and a search component (which may include a search engine used to search for ticketed events). The authentication and electronic asset management module 134B may also include a multifactor authentication component configured to authenticate users. As discussed above, the authentication may be performed by comparing a hash of a unique user identifier and a unique device identifier with that generated by the event access system 102. By way of further example, the authentication may be performed by decrypting data (e.g., using a private key or the key used to perform encryption) comprising a unique user identifier and a unique device identifier, and comparing the decrypted data with that stored by the event access system 102. As similarly discussed elsewhere herein, optionally Advanced Encryption Standard (AES), a symmetric encryption algorithm that encrypts fixed blocks of data (of 128 bits) at a time, may be used. By way of further example, optionally Rivest-Shamir-Adleman (RSA) encryption/decryption techniques may be utilized. By way of yet further example, optionally triple DES (Data Encryption Standard) encryption/decryption techniques may be utilized. By way of yet further example, a hash function may be utilized. Optionally, in addition or instead, authentication may be performed using biometric readings of a user.

An access right verification component may be configured to determine whether an authenticated user has an associated right to access an event at a venue (and/or a portion of an event venue), and an access rights rules engine (e.g., configured to determine which access rights may be loaned, when a given access right may be loaned, for how long a given access right may be loaned, how many access rights may be loaned at a given time, how many access rights may be loaned over a given time period (e.g., in month, in a year, etc.), how frequently a given access right may be loaned, how many access right loans may be recalled over a given time period, and/or the like).

A ticketing module 136B may be configured to enable users to view information regarding ticketed events, access event venue seating charts, view available and unavailable event venue seats, access images of a view from a given seat, view access token prices, create a user account (optionally including some or all of the user account information discussed herein), purchase or otherwise obtain one or more access rights (e.g., access tokens) to the event, store an indication of access rights obtained by the user (e.g., purchased by the user, transferred to the user, lent to the user), store an indication of access rights transferred or by the user to another person, and/or recommend events to the user (e.g., using the user's preferences, access token acquisition history, geographical location, event sponsorship, and/or the like).

An image analysis and processing module 138B may be configured to perform image analysis (e.g., on optical indicia encoding encrypted authentication data), perform contrast enhancement, deblurring, and/or image rotation to thereby enhance the decoding and decryption of images of optical indicia (e.g., barcodes captured using a camera device).

The memory 128B may include an interface module 130B. The interface module 130B can be configured to facilitate generating one or more interfaces through which a compatible computing device may send to, or receive from the authentication and electronic asset management module 134B and ticketing module 136B, data and content.

Figure 2:
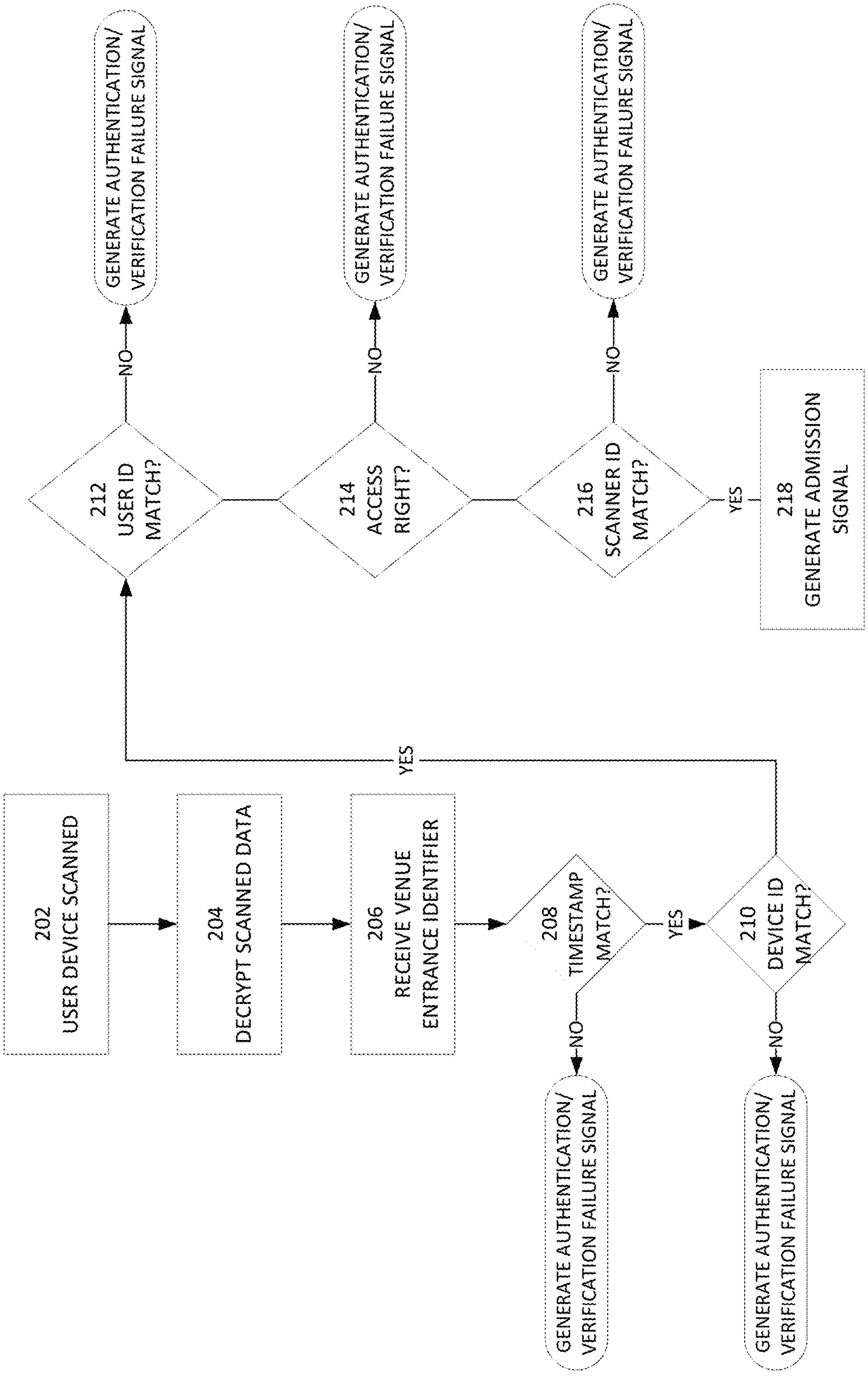
FIGS. 2-4 illustrate example processes.

Referring now to FIG. 2, an example authentication/verification process is illustrated. The process may be executed using an access control system, a venue system, and/or other system, such as described elsewhere herein. Although the following example discusses encryption of authentication data by and presented on a user device, optionally the authentication data is not encrypted. Optionally, the user device presents the authentication data in unencrypted form (e.g., via a barcode), and the authentication data is read by a scanner which encrypts the authentication (e.g., using key encryption or a hash). Optionally, the encryption may be performed by other systems described herein.

At block 202, a user device is scanned by a venue authentication scanner to access encrypted authentication data. As discussed above, the user device may present a unique user identifier and/or a unique device identifier via an encrypted optical code, via an encrypted radiofrequency signal, and/or via an encrypted audio signal. Thus, for example, the scanner may comprise a camera, laser scanner, a radiofrequency receiver, or a microphone.

The scanned authentication data may be compressed. For example, if a camera is used to capture an image of the authentication data, the image may be compressed to reduce the file image size, thereby reducing the memory needed to store the image and the network bandwidth needed to transmit the image. The compression may be lossless or lossy. By way of example, if lossy compression is used, transform coding (e.g., a Discrete Cosine Transform (DCT)) may be used to perform the compression. If lossless compression is used, run length encoding, entropy encoding, predictive coding. The image may optionally be decompressed using a decompression module corresponding to the form of encryption.

Optionally a timestamp generated by an application hosted on the user device is received as well, where the timestamp may or may not be encrypted. The encryption may optionally be performed using a key built into the application (e.g., a public key of the access control system or other system performing the decryption). Optionally, a hash may be applied to the authentication data (e.g., the unique user ID and/or the unique device ID). Optionally, in addition to or instead, a biometric scanner may take a reading of a biometric feature of the user (e.g., a face print, a fingerprint, an iris image, etc.).

At block 204, the encrypted authentication data is decrypted (e.g., using a decryption key, such as a private key associated with the system performing the decryption). Optionally, if the authentication data received is hashed authentication data, the decryption operation is not performed. In addition, the system may generate its own timestamp. Optionally, the encrypted authentication data may be transmitted to a system, remote from the venue authentication scanner, that performs the decryption.

Optionally, image analysis and processing are performed on an image of the optical indica to enhance its readability and hence the accuracy in decoding and decryption. For example, if the optical indicia (e.g., a QR code or other barcode) is black and displayed against a dark background or over an image on the user device, contrast enhancement may be performed in response to detecting insufficient contrast (e.g., by failing to detect clear edges). For example, a filter may be utilized that identifies edge boundaries in the image of the optical indication, such as the edge between a barcode and a background of a contrasting color, and that increases the image contrast in the area immediately adjoining the detected edge.

In addition, if the optical code is blurry it may be difficult to accurately decode and decrypt the optical code. Therefore, a deblurring and/or noise reduction process may be performed. The deblurring process may include the application of a convolutional filter to the image of the optical code. Deblurring and noise reduction may be performed using a deep learning convolutional neural network. The convolutional neural network may optionally include a neural network input layer, one or more neural network hidden layers, a neural network pooling layer, and a neural network output layer. Other learning engines may be used. Convolutional neural networks may also be utilized to perform mage classification, recognition, localization, and/or object detection. Optionally, an autoencoder may be utilized to convert a low resolution image to a higher resolution image.

Optionally, the optical indicia image may be rotated to alight with a desired orientation to further facilitate the decoding and decryption of the encoded authentication data.

At block 206, a venue entrance identifier is received. The venue entrance identifier may correspond to the venue entrance where the authentication scanner is positioned and may be received from the authentication scanner specifically or from the venue system. The venue identifier may be an alphanumeric code and may include descriptive metadata (e.g., entrance 1 on east side of venue).

At block 208, a determination is made as to whether the timestamp received from the user device matches the system generated timestamp. If a determination is made that the timestamps fail to match (e.g., exactly match or match within a certain range of time, such as 1-15 seconds), an authentication/verification failure signal may be generated. The signal may be used to cause the illumination of a light of a certain color (e.g., red), the presentation of text (e.g., "authentication failed") on a display, the presentation of a graphic (e.g., a prohibition symbol) on a display, and/or a generation of a sound (e.g., a boing sound) via a speaker.

If a determination is made that the timestamps match, the process may proceed to block 210. A determination may be made as to whether the device ID value received from the user device matches a unique device ID (e.g., an IMEI, a UDID, a serial number, an IDFA, and/or a GAID) in a user account record. If a determination is made that the received device ID fails to match an authentication/verification failure signal may be generated. The signal may be used to cause the illumination of a light of a certain color (e.g., red), the presentation of text (e.g., "authentication failed") on a display, the presentation of a graphic (e.g., a prohibition symbol) on a display, and/or a generation of a sound (e.g., a boing sound) via a speaker.

If a determination is made that the device IDs match, the process proceeds to block 212. A determination is made as to whether the user ID matches value received from the user device matches a unique user ID in the user account record that stores the matching unique device ID. If a determination is made that the received user ID fails to match, an authentication/verification failure signal may be generated as similarly discussed above.

If a determination is made that the user IDs match, the process proceeds to block 214. At block 214, using the user ID and/or device ID a determination is made via the user account record as to whether the user has an access right to the event at the venue on the current day. For example, the user may have purchased the access rights, had the access rights transferred to the user, or had the access rights lent to the user. In the instance where access right(s) were lent to the user, a determination may be made as to whether the lent access right(s) apply to the current event. For example, it the user was lent access rights to a series of events (e.g., a season for a sporting team or a musician event series), where the loan is associated with a specified start date and a stop date, a determination may be made as whether the current event belongs to the series of events for which the access rights were loaned, whether the current date falls within the start time and the end time of the access right loan, and whether the access right loan has been recalled. In this example, if the current event belongs to the series of events for which the access rights were loaned, falls within the specified start date and end date, and if the access right loan has not been recalled, a determination is made that the user has an access right to the event at the event venue on the current day. Otherwise, a determination may be made that the user does not have an access right to the event at the event venue on the current day.

If a determination is made that the user has an access right to the event at the venue on the current day, optionally, at block 216 a determination may be made as to whether the venue authentication scanner ID corresponds to a venue entrance that the user is entitled to access (e.g., by comparing a seat assigned to the user from the user account with a list of entrances corresponding to access to the assigned seat). If a determination is made that the venue authentication scanner ID does not correspond to a venue entrance that the user is entitled to access an authentication/verification failure signal may be generated as similarly discussed above. Optionally, a notification comprising text may be presented indicating what venue entrance(s) the user is entitled to access. The user may then proceed to such a permitted entrance and repeat the scanning a verification process.

If a determination is made that the venue authentication scanner ID corresponds to a venue entrance that the user is entitled to access, at block 218, an admission signal may be generated. The admission signal may cause the illumination of a light of a certain color (e.g., green), text (e.g., "authentication approved"), a graphic (e.g., a thumbs-up symbol), and/or a sound (e.g., a bell sound). Optionally, the number of access rights that the user has is presented. Optionally, the admission signal may cause an entrance barrier to be unlocked or opened to enable the user to access the entrance. For example, the signal may activate a solenoid, stepper motor, and/or pneumatic actuator to enable the unlocking and/or opening of an entrance door, the withdrawal of a barrier, the unlocking and/or rotation of a turnstile, and/or the like. In addition, the admission signal may be utilized in determining whether an electronic element, such as a UDE, is to be allocated to the user. Further, if the access right has a loaned right from another user, an indication may be stored in the database that the lent access right has been used and may no longer be recalled.

Optionally, rather than comparing user IDs and device IDs, a hash of a User ID and/or device ID received from the user device (e.g., via a radiofrequency signal, an optical indicia, an audio signal) may be compared to a hash of a user ID and/or device ID from a user account to determine if there is a match. If there is a match and if there is a timestamp match, the process may proceed to block 212. Otherwise, an authentication/verification failure signal may be generated as similarly discussed above.

Figure 3:
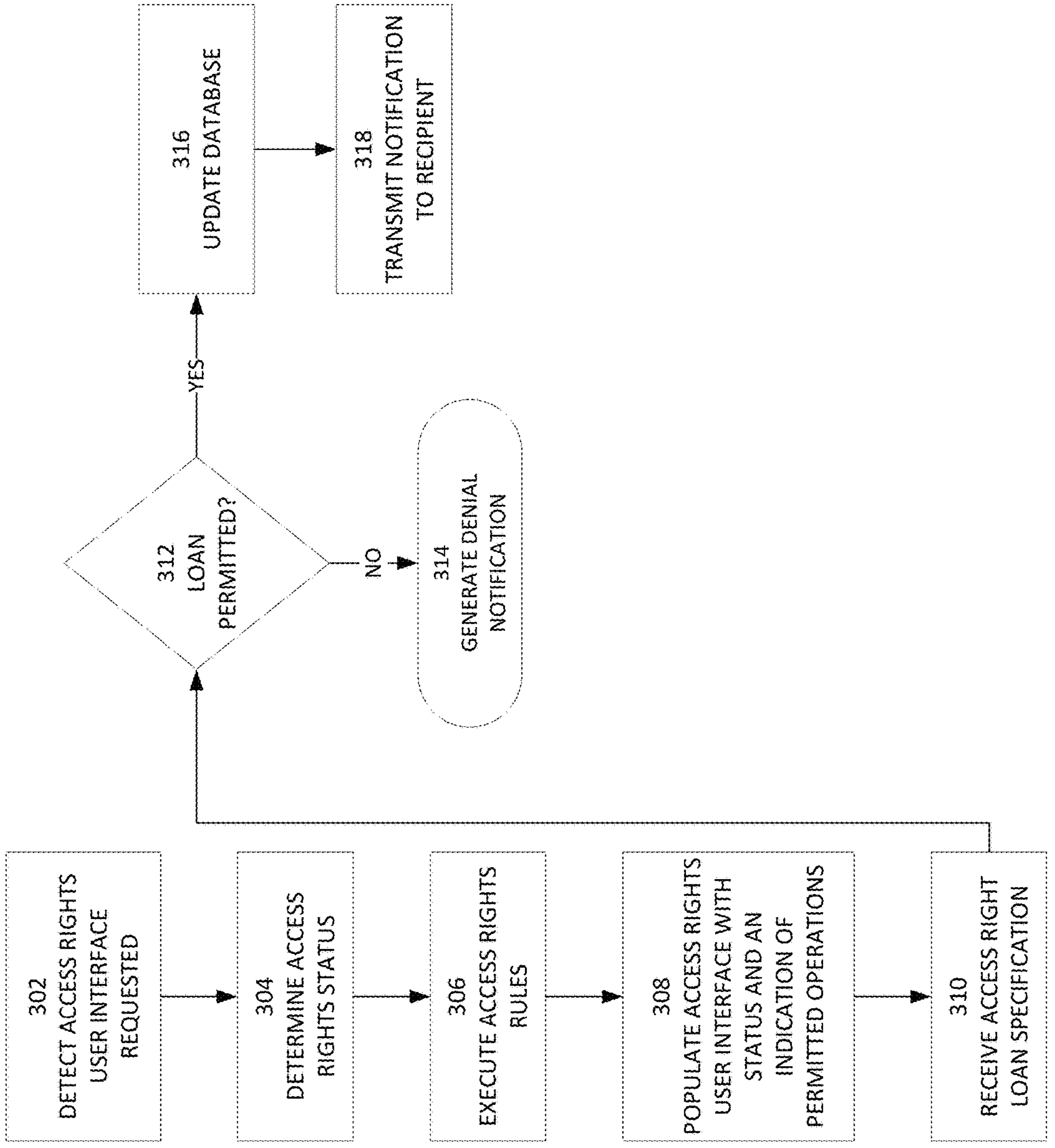

Now referring to FIG. 3, an example process for lending access rights is illustrated. By way of example, the process may be executed in whole or in part using access control system 102, a user device, and/or other device or system disclosed herein. At block 302, the process detects that an access rights user interface has been requested. The access rights user interface may be configured to display access rights associated with the user and the status of such accessed rights. For example, the access rights user interface may be provided by a dedicated application related to ticketing hosted on the user's device (e.g., downloaded from an app store). In response to the user interface being accessed (e.g., in response to a request by a user), the application may transmit a corresponding message to the system over a network. By way of further example, the access rights user interface may be accessed from the access control system 102 by a browser hosted on the user device. The user device may transmit to the system identification data associated with the user. Such identification data may include a user identifier and password, a unique code associated with the dedicated application hosted on the user device, a unique identifier associated with the user device, biometric-related data of the user, and/or other identification data.

At block 304, the identification data is utilized to access a database record corresponding to the user. The database record may include a record of access rights and corresponding status data associated with the user. For example, the database record may identify events (e.g., unique event identifiers, event names, event dates, event venues, event seat locations, etc.) for which the user has access rights, an indication as to whether a given access right has been loaned out and when, an indication as to the loan parameters (e.g., start and/or stop dates, start and/or stop times, other parameters disclosed herein, and/or the like), an indication as to whom a given access right was loaned out to, an indication as to which access rights have been recalled (and associated recall dates), and/or other access rights data such as those disclosed herein.

At block 306, access right loan rules may be accessed from a data store. For example, the access right lending rules may govern which access rights may be loaned, when a given access right may be loaned, for how long a given access right may be loaned, how many access rights may be loaned at a given time, how many access rights may be loaned over a given time period (e.g., in month, in a year, etc.), how frequently a given access right may be loaned, which access rights may be recalled, when access rights may be recalled (if ever), how many access right loans may be recalled over a given time period, and/or the like.

At block 308, a rules engine utilizes the access right rules and the access right data to determine what access rights may be loaned out and if a given access right is not permitted to be loaned at the current time when such access right may be loaned (if ever), and/or which access rights may or may not be recalled.

At block 308, the retrieved access rights associated with the user, the access rights status, and an indication as to what access rights may be currently loaned out, when access rights may be loaned out (for those access rights that may not be currently loaned out), which access rights may be recalled, when access rights may be recalled out (for those access rights that may not be currently be recalled), may be transmitted to the user device and used to populate the access rights user interface.

At block 310, an access right specification may be received from the user via the access rights user interface. For example, the access right specification may specify one or more user selected access rights, and corresponding access rights loan and/or recall specifications. For example, an access rights loan specification may specify an access right that the user controls, an access right loan recipient, an access right loan start state, and/or an access right loan end date. By way of further example, a recall access right specification may specify an access right that the user wishes to recall (e.g., so that the user may utilize the recalled access right or loan or transfer the access right to another recipient) and the timing for the recall (e.g., immediately or at a specified data or event).

At block 312, the access rights rules may optionally be re-executed and a determination may be made as to whether a given access right loan/recall specification violates any rules, and hence whether the access right loan/recall specification is permitted. If the access right loan/recall specification is not permitted, at block 314 a denial notification may be generated and transmitted to the user device (e.g., for display by the dedicated application, a browser, or the like) and/or to an electronic destination associated with the user (e.g., an email address, short messaging service address, other electronic destinations, and/or the like).

If the access right loan/recall specification is permitted, at block 316 the corresponding database record may be updated to record the access rights loan(s) and/or recall(s), such as by setting a database toggle accordingly. At block 318, a notification may be transmitted for display to a specified recipient of a given access right loan and to a previous recipient whose loan is being recalled. For example, the notification may be transmitted to a recipient device for display by the dedicated application, a browser, or the like and/or to an electronic address associated with the recipient (e.g., an email address, short messaging service address, and/or the like).

Figure 4:
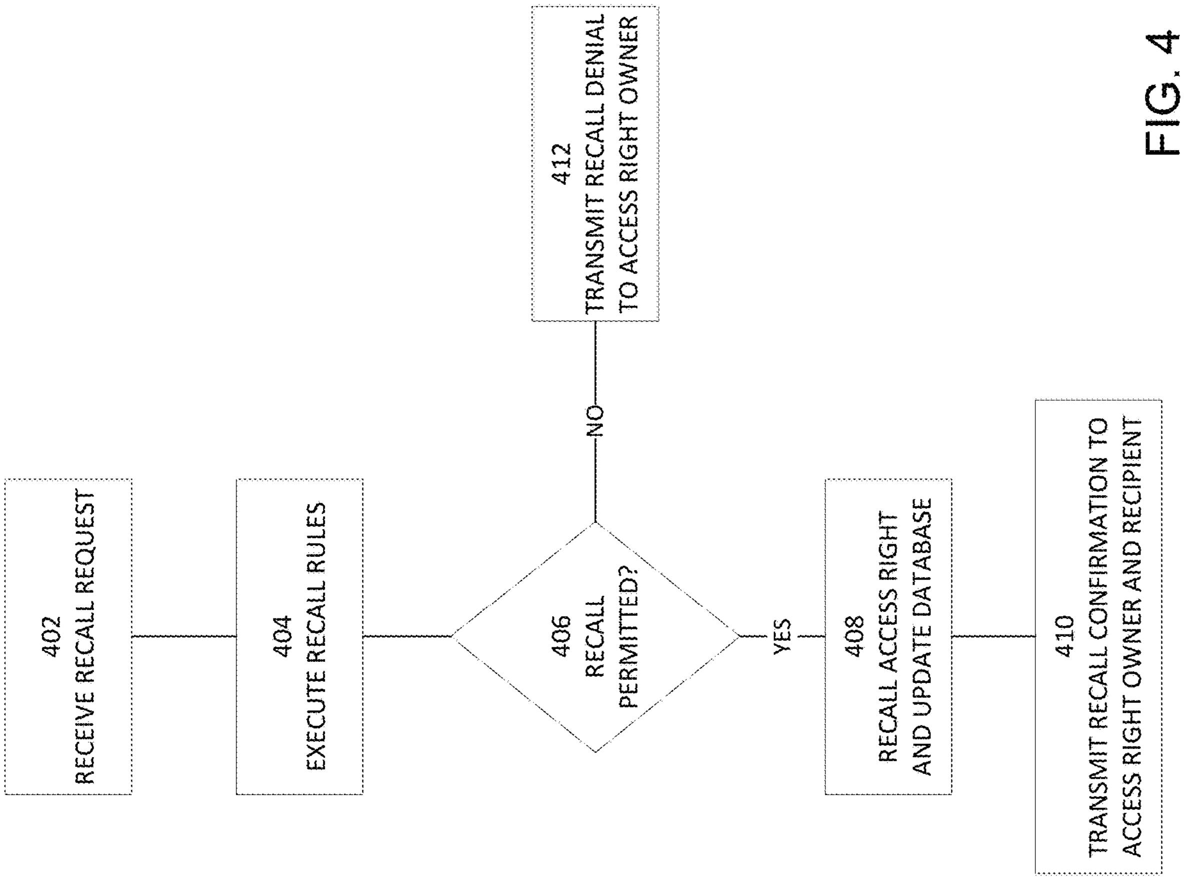

Referring now to FIG. 4 illustrates an example recall process. By way of example, the process may be executed in whole or in part using access control system 102, a user device, and/or other device or system disclosed herein. At block 402, a recall request for a specified access right is received is received from a user device associated with the access right controlling user via an access rights user interface. As similarly discussed elsewhere herein, the access rights user interface may be configured to display access rights associated with the user and the status of such accessed rights. For example, the access rights user interface may be provided by a dedicated application related to ticketing hosted on the user's device (e.g., downloaded from an app store). In response to the access rights user interface being accessed (e.g., in response to a request by a user), the application may transmit a corresponding message to the system over a network. By way of further example, the access rights user interface may be accessed from the access control system 102 by a browser hosted on the user device. The user device may transmit to the system identification data associated with the user. Such identification data may include a user identifier and password, a unique code associated with the dedicated application hosted on the user device, a unique identifier associated with the user device, biometric-related data of the user, and/or other identification data.

At block 404, access right recall rules are executed. For example, the access right recall rules may indicate which lent access rights may be withdrawn/recalled, how many access right loans may be recalled over a given time period, whether there is an expiration date/time or time period after which a given access right may not be recalled, and/or the like. At block 406, a determination is made as to whether the executed rules permit the specified lent access right to be recalled. If a determination is made that the executed rules do not permit the specified lent access right to be recalled, at block 412, a denial notification may be generated and transmitted to the user device (e.g., for display by the dedicated application, a browser, or the like) and/or to an electronic destination associated with the user (e.g., an email address, short messaging service address, other electronic destinations, and/or the like).

If a determination is made that the executed rules do permit the lent access right to be recalled, at block 408, the access right is recalled and the corresponding access right record is updated to reflect the recall, such as by setting a database toggle accordingly. At block 410, a notification may be transmitted for display to the recipient of the lent access right loan and to the user that controls the access right to indicate that the access right has been recalled. For example, the notification may be transmitted to a recipient device and access right controller device for display by the dedicated application, a browser, or the like and/or to an electronic address associated with the recipient (e.g., an email address, short messaging service address, and/or the like) and access right controller.

Thus, an aspect of the present disclosure relates to methods and systems configured to provide dynamic, and optionally recallable access to resources, such as physical locations, for specified periods of time and/or specified events or sets of events. A digital access rights locker may optionally be utilized to store data indicating a user's access rights to physical locations, physical objects, and/or other rights, and the status of such rights.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, other wearable computing device. etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A physical location access control system, comprising:
a network interface;
at least one processing device operable to:
receive, via the network interface, a request from an access controller to provide a temporary access right for a first physical location and/or event in a set of events to a first user, the request providing an indication as to a first time period associated with the temporary access right and/or the event in the set of events to which the access controller has rights to access;
create a temporary access record corresponding to the first time period and/or the event in the set of events;
disable the access controller's access right to access the first physical location for the first time period and/or the event in the set of events;
transmit a communication corresponding to the temporary access record to a destination associated with the first user; and
enable the first user to access the first physical location and/or event in the set of events during the first time period.

2. The physical location access control system as defined in claim 1, wherein the physical location access control system is configured to determine whether the access controller is permitted to provide the temporary access right for the first physical location to the first user for the first time period and/or to the event in the set of events by performing operations comprising:
access a history of provisions by the access controller of temporary access rights;
determine how many temporary access rights have been provided by the access controller to users over a second period of time; and
at least partly in response to determining that the access controller has provided less than a first threshold number of temporary access rights over the second period of time,
determine that the access controller is permitted to provide the temporary access right for the first physical location to the first user for the first time period or to the event in the set of events.

3. The physical location access control system as defined in claim 1, wherein the physical location access control system is configured to determine whether the access controller is permitted to provide the temporary access right for the first physical location to the first user for the first time period and/or to the event in the set of events by performing operations comprising:
access a history of provisions of temporary access rights associated with the access controller;
determine how many temporary access rights have been provided by the access controller to users; and
at least partly in response to determining that the access controller is currently providing less than a first threshold number of temporary access rights,
determine that the access controller is permitted to provide the temporary access right for the first physical location to the first user for the first time period or to the event in the set of events.

4. The physical location access control system as defined in claim 1, wherein the system is configured to perform operations comprising:
during the first time period:
receive, from a device at the first physical location, a first hash comprising a hash of an identifier identifying a user communication device associated with the first user and an identifier identifying the first user;
compare the first hash comprising the hash of the identifier identifying the user communication device associated with the first user and the identifier identifying the first user with a second hash generated using data stored in a database record associated with the first user;
at least partly in response to determining that the first hash and the second hash match, access the temporary access record; and
based at least in part on the accessed temporary access record, cause a command to be transmitted to an indicator at the first physical location, the command configured to cause the indicator to provide an access permitted indication.

5. The physical location access control system as defined in claim 1, wherein the system is configured to perform operations comprising:
during the first time period:
receive, from a device at the first physical location, first biometric data for a given user captured at the first physical location;
compare the received first biometric data with data stored in a database record associated with the first user;
at least partly in response to determining that the first biometric data corresponds to data stored in a database record associated with the first user, access the temporary access record; and
based at least in part on the accessed temporary access record, cause a command to be transmitted to an indicator at the first physical location, the command configured to cause the indicator to provide an access permitted indication.

6. The physical location access control system as defined in claim 1, wherein the system is configured to perform operations comprising:
receive a request from the access controller to recall the temporary access right to the first location;
determine whether the temporary access right is currently recallable;
at least partly in response to determining that the temporary access right is not currently recallable, transmit a recall failure notification to the access controller.

7. The physical location access control system as defined in claim 1, wherein the temporary access right comprises an access right to a first event of a set of events.

8. The physical location access control system as defined in claim 1, wherein the temporary access right comprises an access right to a specified area within the first physical location.

9. The physical location access control system as defined in claim 1, wherein the system is configured to perform operations comprising:

record a token on a distributed synchronized database at least partly in response to provision of the temporary access right to the first user.

10. A computer-implemented method, the method comprising:

receiving at a computer system, via a network interface, an instruction from an access right controller, to provide a recallable first access right associated with a first physical location and/or first event to a first user, wherein the recallable first access right is recallable by the access right controller;

at least partly in response to the instruction from the access right controller:

recording an indication in a memory regarding a provision of the recallable first access right to the first user, and inhibiting the access right controller's ability to utilize the recallable first access right associated with the first physical location and/or first event;

receiving, over the network, a recall request regarding the recallable first access from the access right controller;

recording an indication regarding the recall of the recallable first access right and enable the access right controller to utilize the recallable first access right associated with the first physical location and/or first event, and inhibiting the first user's ability to utilize the recallable first access right associated with the first physical location and/or first event.

11. The computer-implemented method as defined in claim 10, the method further comprising:

wherein determining whether the recallable access right is currently recallable comprises:

determining whether the first user has utilized the recallable access right.

12. The computer-implemented method as defined in claim 10, the method further comprising:

wherein the recallable first access right is recallable by the access right controller if a first condition is satisfied, wherein the first condition is satisfied when the recall request is within a first time period, and determining whether the recallable access right is currently recallable comprises:

determining whether a current time is within the first time period.

13. The computer-implemented method as defined in claim 10, the method further comprising:

determining whether the access right controller is permitted to provide the first access right for the first physical location to the first user based at least in part on:

a history of provisions of access rights associated with the access right controller, the history including a quantity of access rights have been provided by the access right controller to users.

14. The computer-implemented method as defined in claim 10, the method further comprising:

determining whether the access right controller is permitted to provide the first access right for the first physical location and/or first event to the first user based at least in part on:

a number of access rights associated with the access right controller that are currently provided by the access right controller to users.

15. The computer-implemented method as defined in claim 10, wherein the first access right comprises an access right to at least one event in a set of events.

16. The computer-implemented method as defined in claim 10, wherein the first access right comprises an access right to a specified area within the first physical location.

17. The computer-implemented method as defined in claim 10, the method further comprising:

recording a token on a distributed synchronized database at least partly in response to the provision of the recallable first access right to the first user.

18. Non-transitory computer readable memory that stores instructions, that when executed by a computer system comprising one or more computing devices, cause the computer system to perform operations comprising:

receive at a first time a request from a requester to provide a recallable access right for a first physical location for a first event and/or a first time period to a first user;

store an indication corresponding to provision of the recallable access right to the first event and/or the first time period to the first user;

inhibit the requester's access of the first physical location for the first event and/or the first time period;

transmit a communication corresponding to provision of the recallable access right to a destination associated with the first user; and enable the first user to access the first physical location for the first event and/or the first time period.

19. The non-transitory computer readable memory as defined in claim 18, the operations further comprising determining whether the requester is permitted to provide the recallable access right for the first physical location to the first user by at least:

accessing a history of provisions of recallable access rights associated with the requester;

determining how many recallable access rights have been provided by the requester to users over a second period of time; and at least partly in response to determining that the requester has provided less than a first threshold number of recallable access rights over the second period of time, determining that the requester is permitted to provide the recallable access right for the first physical location for the first event and/or the first time period to the first user.

20. The non-transitory computer readable memory as defined in claim 18, the operations further comprising determining whether the requester is permitted to provide the recallable access right for the first physical location for the first event and/or the first time period to the first user by at least:

accessing a history of provisions of recallable access rights associated with the requester;

determining how many recallable access rights are currently provided by the requester to users; and at least partly in response to determining that the requester is currently providing less than a first threshold number of recallable access rights, determining that the requester is permitted to provide the recallable access right for the first physical location for the first event and/or the first time period to the first user.

21. The non-transitory computer readable memory as defined in claim 18, the operations comprising:

receive, from a device at the first physical location, a first hash comprising a hash of an identifier identifying a user communication device associated with the first user and an identifier identifying the first user;

compare the first hash comprising the hash of the identifier identifying the user communication device associated with the first user and the identifier identifying the first user with a second hash generated using data stored in a database record associated with the first user;

at least partly in response to determining that the first hash and the second hash correspond, access a record associated with the access right; and based at least in part on the accessed record associated with the access right, cause a command to be transmitted to an indicator at the first physical location, the command configured to cause the indicator to provide an access permitted indication.

22. The non-transitory computer readable memory as defined in claim 18, the operations comprising:

receive, from a device at the first physical location, first biometric data for a given user captured at the first physical location;

compare the received first biometric data with data stored in a database record associated with the first user;

at least partly in response to determining that the first biometric data corresponds to data stored in a database record associated with the first user, access a record associated with the access right;

based at least in part on the accessed record associated with the access right, cause a command to be transmitted to an indicator at the first physical location, the command configured to cause the indicator to provide an access permitted indication.

23. The non-transitory computer readable memory as defined in claim 18, the operations comprising:

receive a request from the requester to recall the access right to the first location;

determine whether the recallable access right is currently recallable;

at least partly in response to determining that the recallable access right is not currently recallable, transmit a recall failure notification to an access right controller.

24. The non-transitory computer readable memory as defined in claim 18, wherein the recallable access right comprises an access right to a first event of a set of events.

25. The non-transitory computer readable memory as defined in claim 18, wherein the recallable access right comprises an access right to a specified area within the first physical location.

26. The non-transitory computer readable memory as defined in claim 18, the operations further comprising:

record a token on a distributed synchronized database at least partly in response to the provision of the recallable first access right to the first user.

* * * * *